United States Patent Office.

JOHN NAGELE, OF DUNCANSVILLE, PENNSYLVANIA.

Letters Patent No. 62,770, dated March 12, 1867.

IMPROVEMENT IN THE MANUFACTURE OF ARTIFICIAL STONE.

*The Schedule referred to in these Letters Patent and making part of the same.*

TO ALL WHOM IT MAY CONCERN:

Be it known that I, JOHN NAGELE, of Duncansville, in the county of Blair, and State of Pennsylvania, have invented a new Composition of Artificial Stone; and I do hereby declare the following to be an exact description thereof.

The object of my invention is the manufacturing of a cheap and ornamental stone for roofing, paving, and ornamental purposes, made by heavy pressure under water, and I use the following ingredients:

One part of cement, one part of washed gravel, and one part of sharp washed sand.

The cement is composed of silicate of lime, magnesia, oxide of iron, and aluminate of lime, which, in a high degree, possess the quality of hardening under water in a short time as hard as stone. The whole composition is thoroughly mixed and put under water under a heavy pressure for forty-eight hours, when the stone is ready to be made use of, as a hard, firm, and compact stone, suitable for buildings and ornamental purposes, and most useful on account of its cheapness and durability, and as an article of manufacture.

What I claim as my invention, and desire to secure by Letters Patent, is—

The composition of the ingredients when used in the quantities as herein described, and placed under water under a heavy pressure for the purpose of producing a cheap and durable artificial stone.

JOHN NAGELE.

Witnesses:
  JNO. CASSURLE, Jr.,
  D. L. MARTIN.